US008756212B2

(12) United States Patent
Chipalkatti et al.

(10) Patent No.: US 8,756,212 B2
(45) Date of Patent: Jun. 17, 2014

(54) TECHNIQUES FOR WEB SITE INTEGRATION

(75) Inventors: Renu Chipalkatti, Lexington, MA (US);
Jeffrey Getchius, Cambridge, MA (US);
Jay Ponte, Waltham, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/497,887

(22) Filed: Jul. 6, 2009

(65) Prior Publication Data

US 2009/0327283 A1    Dec. 31, 2009

Related U.S. Application Data

(63) Continuation of application No. 11/138,028, filed on May 26, 2005, which is a continuation of application No. 09/566,511, filed on May 8, 2000, now Pat. No. 6,912,525.

(51) Int. Cl.
*G06F 17/30* (2006.01)

(52) U.S. Cl.
USPC .......................................... 707/708; 709/203

(58) Field of Classification Search
USPC ............ 707/999.003, 696, 708, 955; 709/203
See application file for complete search history.

(56) References Cited

U.S. PATENT DOCUMENTS

| 4,003,024 A | 1/1977 | Riganati et al. |
| 4,365,304 A | 12/1982 | Ruhman et al. |
| 5,181,162 A | 1/1993 | Smith et al. |
| 5,187,747 A | 2/1993 | Capello et al. |
| 5,206,949 A | 4/1993 | Cochran et al. |
| 5,274,802 A | 12/1993 | Altine |
| 5,321,833 A | 6/1994 | Chang et al. |
| 5,369,761 A | 11/1994 | Conley et al. |
| 5,371,807 A | 12/1994 | Register |
| 5,398,335 A | 3/1995 | Lewis |
| 5,404,514 A | 4/1995 | Kageneck et al. |
| 5,412,566 A | 5/1995 | Sawa |
| 5,418,961 A | 5/1995 | Segal et al. |
| 5,497,491 A | 3/1996 | Mitchell et al. |
| 5,544,360 A | 8/1996 | Lewak et al. |
| 5,619,410 A | 4/1997 | Emori et al. |

(Continued)

FOREIGN PATENT DOCUMENTS

| EP | 0813158 | 12/1997 |
| JP | 2000-112990 | 4/2000 |

OTHER PUBLICATIONS

U.S. Appl. No. 09/282,764, filed Mar. 1999, Jay Michael Ponte et al.

(Continued)

*Primary Examiner* — Sathyanarayan Pannala
(74) *Attorney, Agent, or Firm* — Fish & Richardson P.C.

(57) ABSTRACT

Disclosed is a method and device for finding documents, such as Web pages, for presentation to a user, automatically or in response to a user expression of interest, which documents are part of a Web site being accessed by the user, and which documents relate to a document, such as a Web page, being accessed in the Web site. The method takes advantage of information retrieval techniques. The method generates the search query to use to find documents by reference to the text of the document in the Web site being accessed by the user. The method further uses a weighting function to weigh the terms used in the search query.

19 Claims, 6 Drawing Sheets

(56) References Cited

U.S. PATENT DOCUMENTS

| | | | |
|---|---|---|---|
| 5,625,767 A | 4/1997 | Bartell et al. | |
| 5,659,732 A | 8/1997 | Kirsch | |
| 5,659,742 A | 8/1997 | Beattie et al. | |
| 5,704,560 A | 1/1998 | Wimmer | |
| 5,715,443 A | 2/1998 | Yanagihara et al. | |
| 5,717,924 A | 2/1998 | Kawai | |
| 5,721,897 A | 2/1998 | Rubinstein | |
| 5,724,571 A * | 3/1998 | Woods | 707/999.005 |
| 5,734,887 A | 3/1998 | Kingberg et al. | |
| 5,754,938 A | 5/1998 | Herz et al. | |
| 5,764,906 A | 6/1998 | Edelstein et al. | |
| 5,781,904 A | 7/1998 | Oren et al. | |
| 5,794,178 A | 8/1998 | Caid et al. | |
| 5,802,527 A | 9/1998 | Brechtel et al. | |
| 5,809,261 A | 9/1998 | Lambrecht | |
| 5,809,502 A | 9/1998 | Burrows | |
| 5,819,092 A | 10/1998 | Ferguson et al. | |
| 5,819,291 A | 10/1998 | Haimowitz et al. | |
| 5,826,261 A | 10/1998 | Spencer | |
| 5,832,476 A | 11/1998 | Tada et al. | |
| 5,835,087 A | 11/1998 | Herz et al. | |
| 5,845,278 A | 12/1998 | Kirsch et al. | |
| 5,855,015 A | 12/1998 | Shoham | |
| 5,870,740 A | 2/1999 | Rose et al. | |
| 5,895,470 A | 4/1999 | Pirolli et al. | |
| 5,898,780 A | 4/1999 | Liu et al. | |
| 5,899,999 A | 5/1999 | De Bonet | |
| 5,907,837 A | 5/1999 | Ferrel et al. | |
| 5,915,249 A | 6/1999 | Spencer | |
| 5,920,859 A | 7/1999 | Li | |
| 5,924,105 A | 7/1999 | Punch et al. | |
| 5,926,811 A | 7/1999 | Miller et al. | |
| 5,933,822 A * | 8/1999 | Braden-Harder et al. | 707/999.005 |
| 5,937,392 A | 8/1999 | Alberts | |
| 5,937,402 A | 8/1999 | Pandit | |
| 5,941,947 A | 8/1999 | Brown et al. | |
| 5,943,669 A | 8/1999 | Numata | |
| 5,950,198 A | 9/1999 | Falls et al. | |
| 5,956,039 A | 9/1999 | Woods et al. | |
| 5,956,716 A | 9/1999 | Kenner et al. | |
| 5,956,722 A | 9/1999 | Jacobson et al. | |
| 5,960,430 A | 9/1999 | Haimowitz et al. | |
| 5,983,216 A | 11/1999 | Kirsch et al. | |
| 5,987,457 A | 11/1999 | Ballard | |
| 5,991,755 A | 11/1999 | Noguchi et al. | |
| 5,995,979 A | 11/1999 | Cochran | |
| 6,006,230 A | 12/1999 | Ludwig et al. | |
| 6,009,410 A | 12/1999 | LeMole et al. | |
| 6,009,459 A | 12/1999 | Belfiore et al. | |
| 6,014,663 A | 1/2000 | Rivette et al. | |
| 6,018,733 A | 1/2000 | Kirsch et al. | |
| 6,026,388 A | 2/2000 | Liddy et al. | |
| 6,028,605 A | 2/2000 | Conrad et al. | |
| 6,029,195 A | 2/2000 | Herz | |
| 6,032,145 A | 2/2000 | Beall et al. | |
| 6,038,561 A | 3/2000 | Snyder | |
| 6,047,210 A | 4/2000 | Kim et al. | |
| 6,047,310 A | 4/2000 | Kamakura et al. | |
| 6,055,528 A | 4/2000 | Evans | |
| 6,055,535 A | 4/2000 | Suzuoka et al. | |
| 6,061,515 A | 5/2000 | Chang et al. | |
| 6,067,552 A | 5/2000 | Yu | |
| 6,070,158 A | 5/2000 | Kirsch et al. | |
| 6,073,140 A | 6/2000 | Morgan et al. | |
| 6,078,916 A | 6/2000 | Culliss | |
| 6,078,929 A | 6/2000 | Rao | |
| 6,081,774 A | 6/2000 | De Hita et al. | |
| 6,092,061 A | 7/2000 | Choy | |
| 6,094,649 A | 7/2000 | Bowen et al. | |
| 6,098,064 A | 8/2000 | Pirolli | |
| 6,098,066 A | 8/2000 | Snow et al. | |
| 6,101,515 A | 8/2000 | Wical et al. | |
| 6,101,537 A | 8/2000 | Edelstein et al. | |
| 6,122,647 A | 9/2000 | Horowitz et al. | |
| 6,125,361 A * | 9/2000 | Chakrabarti et al. | 707/999.003 |
| 6,128,613 A | 10/2000 | Wong et al. | |
| 6,148,289 A | 11/2000 | Virdy | |
| 6,154,737 A * | 11/2000 | Inaba et al. | 707/696 |
| 6,154,811 A | 11/2000 | Srbljic et al. | |
| 6,157,930 A | 12/2000 | Ballard et al. | |
| 6,167,398 A | 12/2000 | Wyard et al. | |
| 6,178,418 B1 | 1/2001 | Singer | |
| 6,182,083 B1 | 1/2001 | Scheifler et al. | |
| 6,182,133 B1 | 1/2001 | Horvitz | |
| 6,189,019 B1 | 2/2001 | Blumer et al. | |
| 6,199,082 B1 | 3/2001 | Ferrel et al. | |
| 6,209,038 B1 | 3/2001 | Bowen et al. | |
| 6,212,517 B1 | 4/2001 | Sato et al. | |
| 6,233,575 B1 | 5/2001 | Agrawal et al. | |
| 6,243,732 B1 | 6/2001 | Arakawa et al. | |
| 6,253,248 B1 | 6/2001 | Nakai et al. | |
| 6,269,361 B1 * | 7/2001 | Davis et al. | 707/999.003 |
| 6,269,368 B1 | 7/2001 | Diamond | |
| 6,282,542 B1 | 8/2001 | Carneal et al. | |
| 6,286,000 B1 | 9/2001 | Apte et al. | |
| 6,295,529 B1 | 9/2001 | Corston-Oliver et al. | |
| 6,327,574 B1 | 12/2001 | Kramer et al. | |
| 6,334,145 B1 | 12/2001 | Adams et al. | |
| 6,336,112 B2 | 1/2002 | Chakrabarti et al. | |
| 6,338,059 B1 | 1/2002 | Fields et al. | |
| 6,347,312 B1 | 2/2002 | Byrne et al. | |
| 6,353,822 B1 * | 3/2002 | Lieberman | 707/999.003 |
| 6,353,825 B1 | 3/2002 | Ponte | |
| 6,356,899 B1 | 3/2002 | Chakrabarti et al. | |
| 6,360,215 B1 | 3/2002 | Judd et al. | |
| 6,363,373 B1 | 3/2002 | Steinkraus | |
| 6,363,378 B1 | 3/2002 | Conklin et al. | |
| 6,374,241 B1 | 4/2002 | Lamburt et al. | |
| 6,389,412 B1 | 5/2002 | Light | |
| 6,393,415 B1 | 5/2002 | Getchius et al. | |
| 6,393,427 B1 | 5/2002 | Vu et al. | |
| 6,397,228 B1 | 5/2002 | Lamburt et al. | |
| 6,405,188 B1 | 6/2002 | Schwartz et al. | |
| 6,408,294 B1 | 6/2002 | Getchius et al. | |
| 6,415,250 B1 | 7/2002 | Van der Akker | |
| 6,421,683 B1 | 7/2002 | Lamburt | |
| 6,484,161 B1 | 11/2002 | Scofield et al. | |
| 6,493,721 B1 | 12/2002 | Getchius et al. | |
| 6,496,818 B1 | 12/2002 | Ponte | |
| 6,496,843 B1 | 12/2002 | Getchius et al. | |
| 6,507,839 B1 | 1/2003 | Ponte | |
| 6,513,031 B1 | 1/2003 | Fries et al. | |
| 6,546,556 B1 | 4/2003 | Kataoka et al. | |
| 6,578,056 B1 | 6/2003 | Lamburt | |
| 6,578,113 B2 | 6/2003 | Krishnamurthy et al. | |
| 6,581,038 B1 | 6/2003 | Mahran | |
| 6,581,056 B1 | 6/2003 | Rao | |
| 6,631,496 B1 | 10/2003 | Li et al. | |
| 6,718,363 B1 | 4/2004 | Ponte | |
| 6,826,559 B1 | 11/2004 | Ponte | |
| 6,850,935 B1 | 2/2005 | Ponte | |
| 6,907,429 B2 | 6/2005 | Carneal et al. | |
| 6,912,525 B1 | 6/2005 | Chipalkatti et al. | |
| 6,954,901 B1 | 10/2005 | Desai et al. | |
| 6,978,419 B1 | 12/2005 | Kantrowitz | |
| 6,981,256 B2 | 12/2005 | Jawahar et al. | |
| 7,047,242 B1 | 5/2006 | Ponte | |
| 7,110,996 B2 | 9/2006 | Kawamura | |
| 7,251,637 B1 | 7/2007 | Caid et al. | |
| 7,263,530 B2 | 8/2007 | Hu et al. | |
| 7,392,303 B2 | 6/2008 | Smith et al. | |
| 7,409,422 B2 | 8/2008 | Christian et al. | |
| 7,421,432 B1 * | 9/2008 | Hoelzle et al. | 707/999.004 |
| 7,596,609 B1 | 9/2009 | Refuah et al. | |
| 2001/0039544 A1 | 11/2001 | Chakrabarti et al. | |
| 2002/0073206 A1 | 6/2002 | Jawahar et al. | |
| 2002/0165737 A1 | 11/2002 | Mahran | |
| 2003/0061272 A1 | 3/2003 | Krishnamurthy et al. | |
| 2003/0163462 A1 | 8/2003 | Kawamura | |
| 2004/0064438 A1 | 4/2004 | Kostoff | |
| 2004/0230577 A1 | 11/2004 | Kawatani | |
| 2005/0216478 A1 | 9/2005 | Chipalkatti et al. | |
| 2006/0167872 A1 | 7/2006 | Parikh | |

(56) References Cited

U.S. PATENT DOCUMENTS

| | | |
|---|---|---|
| 2006/0259481 A1 | 11/2006 | Handley |
| 2008/0195595 A1 | 8/2008 | Masuyama et al. |
| 2009/0037390 A1 | 2/2009 | Handley |

OTHER PUBLICATIONS

Aronow, D.B. et al., "Automated Classification of Encounter Notes in a Computer Based Medical Record", *Proceedings of the Eighth World Congress on Medical Informatics*, Vancouver, Canada. Jul. 1995. pp. 8-12.

Aronow, D.B., et al. "Automated Classification of Encounter Notes in a Computer Based Medical Record", Center for Intelligent Information Retrieval, Lederle Graduate Research Center, University of Massachusetts, 1994.

Barlow, Linda, "A Helpful Guide to Web Search Engines", Internet Article on www.monash.com, Aug. 1999.

Barlow, Linda, "How to Use Web Search Engines", Internet Article, on www.monash.com, Aug. 1999.

Biswas, Gautam, et al., "Iterate: A Conceptual Clustering Algorithm for Data Mining", IEEE, 1999, pp. 219-229.

Blankenhom, Dana, "Competitors finding opportunity, perils in Nets Inc. demise", Business Marketing, p. 3, Jun. 1997.

Callan, James P. et al., "The Inquery Retrieval System", *Proceedings of the Third International Conference on Database and Expert Systems Application*, pp. 78-83, Springer Verlag, 1992.

Chakrabarti, Soumen, et al., "Scalable Feature Selection, Classification and Signature Generation for Organizing Large Text Databases into Hierarchical Topic Taxonomies", ACM, 1998, pp. 163-178.

"eElectronic Directory News", Yellow pp. & Directory report, v. 12, n. 18, Oct. 23, 1996.

"GTE Superpages," Business Editors, Oct. 23, 1997.

Haines, David et al., "Relevance Feedback and Inference Networks", University of Massachusetts, pp. 1-5, Aug. 22, 1994.

"Introduction to TCP/IP", Yale University, Feb. 2, 1995, Internet Article, http://www.yale.edu/pclt/comm/tcpip.htm, pp. 1-6.

Jones, Steve, et al., "Topic-based Browsing Within a Digital Library Using Keyphrases", ACM, Dec. 1998, pp. 114-121.

Larkey, Leah S., "Combining Classifiers in Text Categorization", Center for Intelligent Information Retrieval, Department of Computer Science, University of Massachusetts, Amherst, MA, pp. 1-19, Mar. 20, 1996.

Leistensnider et al., "A Simple Probablistic Approach to Classification and Routing", IEEE, 1997, pp. 750-754.

Lewis, D.D., et al., "Training Algorithms for Linear Text Classifiers", *Proceedings of the Nineteenth Annual International ACM SIGIR Conference on Research and Development in Information Retrieval*, Zurich, Switzerland, 1996. pp. 198-315.

Lewis, D.D., et al., "Training Algorithms for Linear Text Classifiers", Center for Intelligent Information Retrieval, Lederle Graduate Research Center, University of Massachusetts, 1994.

Lin, ChunChen, et al., "Logical Structure Analysis of Book Document Images Using Content Information", IEEE, 1997, pp. 1048-1054.

Merriam-Webster College Dictionary, $10^{th}$ Ed. (Springfield MA: Merriam Webster, 1997), p. 70, including definitions of "associate".

"Method of Selecting Audio-Clips for Playing During Visual Presentation of Web Pages—Using Software to Select Set of Advertisements in Form of Audio Clips to Rotate for Presentation Based on Search Criteria", IBM Corp., Research Disclosure 411109, Jul. 10, 1998.

Moffat, Alistair, et al. "Self-Indexing Inverted Files for Fast Text Retrieval," ACM; 1996; pp. 349-379.

Rocchio, J.J., Jr., "Relevance Feedback in Information Retrieval", *The Smart Retrieval System—Experiments in Automatic Documents Processing*, Prentice Hall, Inc., N.J., 1971, pp. 313-323.

Salton, Gerard, and Chris Buckley, "Improving Retrieval Performance by Relevance Feedback", *Journal of the American Society for Information Science*, Jun. 1990. pp. 288-297.

Sterne, Jim, "What makes people click: advertising on the Web", (Indianapolis IN: Que Corp., 1997), p. 168.

Sullivan, Danny, "How Search Engines Work", Internet Article on SearchEngineWatch.com, 1999.

Sullivan, Danny, "How Search Engines Rank Web Pages", Internet Article on SearchEngineWatch.com, 1999.

Walsh, B., and Lynch, M.; "Long-term Response: Finite Populations"; Dec. 10, 1998, Draft Version; pp. 291-345.

Wong, Clinton, "Chapter 6. Example LWP Programs", Web Client Programming with Perl, O'Reilly & Associates, Mar. 1997, pp. 117-141.

Golomb, S.W., "Run-length encodings", IEEE Transactions Information Theory, 1966, vol. 12, No. 3, pp. 399-401.

Doug P's Review of Paper, "Information Retrieval Performance by Relevance Feedback," by Salton, Gerard et al., Dept. of Computer Science, Cornell University, Ithaca, NY, May 20, 1999, pp. 1-4.

\* cited by examiner

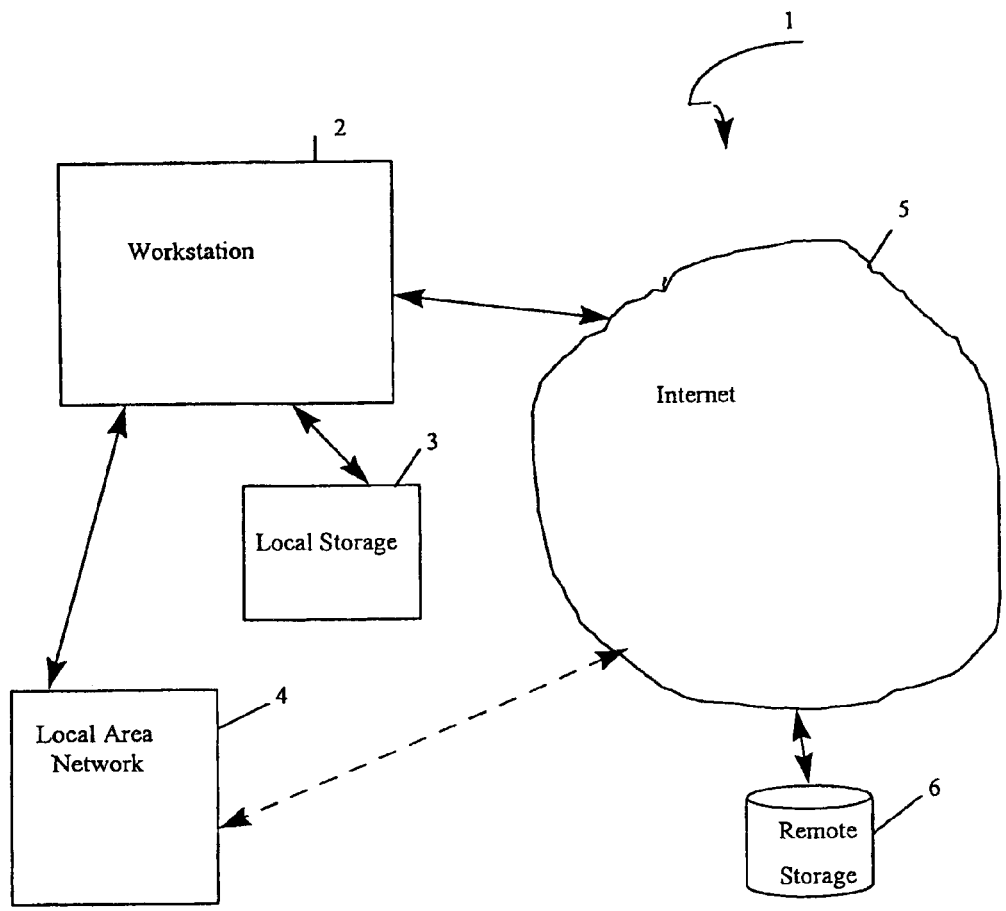
Figure 1 - Computer System
(With Connections to Local Area Network, Local Storage, and Internet)

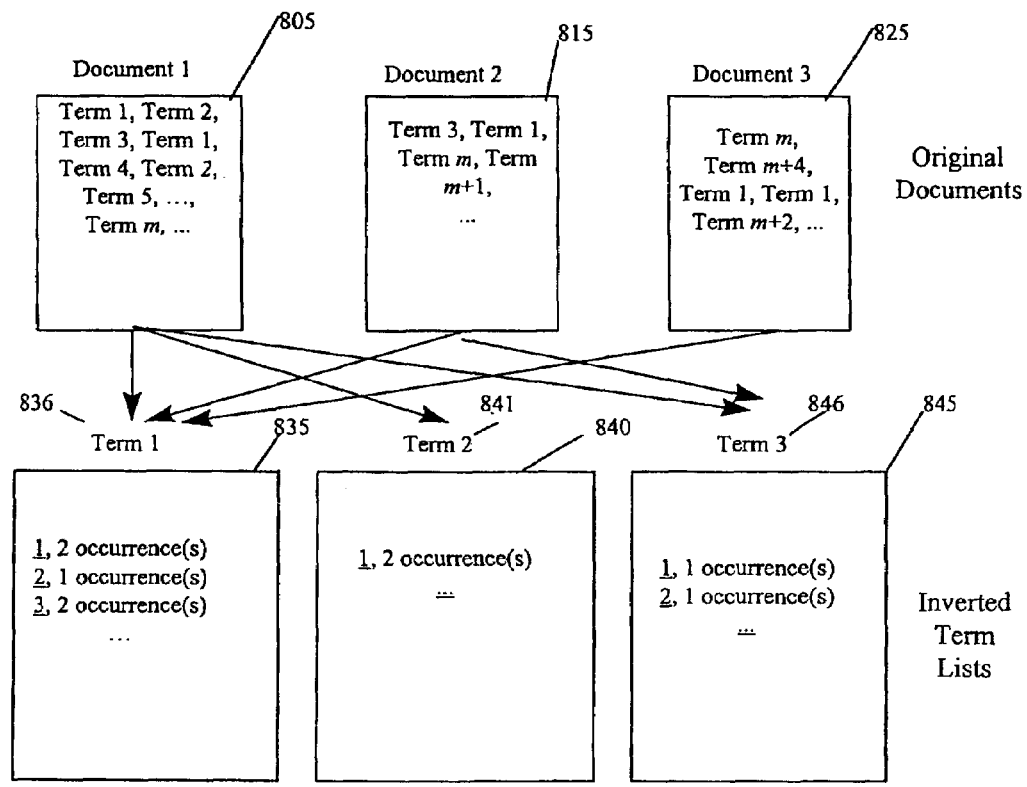
Figure 2 - Relationship Between Documents and Inverted Term Lists (Prior Art)

| Document # | Document URL |
|---|---|
| 1 | URL 1 |
| 2 | URL 2 |
| 3 | URL 3 |
| ... | |

Lookup Table

| Term # | Term | ITL Address | Number of Documents Containing Term | $TF_{MAX}$ |
|---|---|---|---|---|
| 1 | "Term 1" | Loc. 1 | $N_1$ | $TF_{M1}$ |
| 2 | "Term 2" | Loc. 2 | $N_2$ | $TF_{M2}$ |
| 3 | "Term 3" | Loc. 3 | $N_3$ | $TF_{M3}$ |

Lookup Table

Figure 3 - Lookup Tables Which May Be Used With Inverted Term Lists (Prior Art)

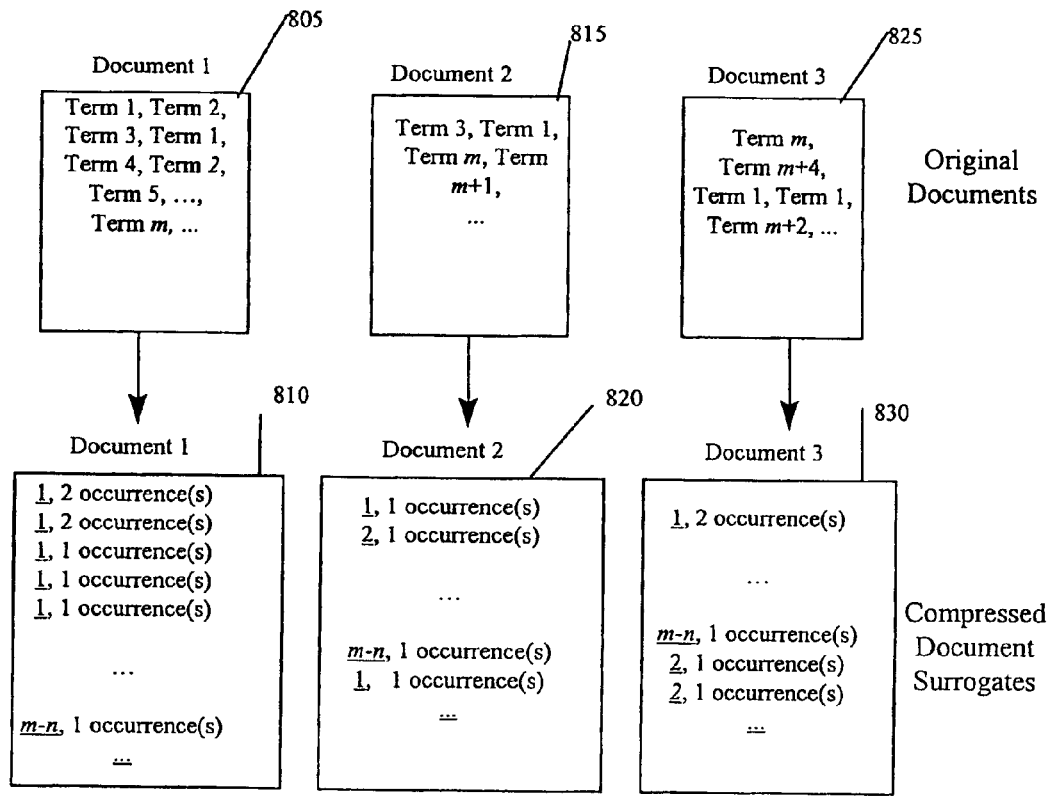
Figure 4 - Relationship Between Documents and Compressed Document Surrogates

TECHNIQUES FOR WEB SITE INTEGRATION

RELATED APPLICATIONS

This application is a continuation of U.S. patent application Ser. No. 11/138,028, filed May 26, 2005, which is a continuation of U.S. patent application Ser. No. 09/566,511, filed May 8, 2000, now U.S. Pat. No. 6,912,525, the disclosures of which are hereby incorporated herein by reference.

TECHNICAL FIELD

This invention relates to techniques for retrieving material on the World Wide Web, and more particularly to methods of presenting portions of Web sites which may be of interest, to a user of another portion of the Web site.

BACKGROUND OF THE INVENTION

The Internet, of which the World Wide Web is a part, consists of a series of interlinked computer networks and servers around the world. Users of one server or network which is connected to the Internet may send information to, or access information on, any other network or server connected to the Internet by the use of various computer programs which allow such access, such as Web browsers. The information is sent to or received from a network or server in the form of packets of data.

The World Wide Web portion of the Internet consists of a subset of interconnected Internet sites which are characterized by containing information in a format suitable for graphical display on a computer screen. Each site may consist of one or more separate pages. Pages in turn frequently contain links to other pages within the site, or to pages in other Web sites, facilitating the user's rapid movement from one page or site to another.

The Web is so large that users frequently call upon specialized programs such as Web browsers or search engines to help them locate information of interest on the Web. These specialized programs may analyze information about Web sites in a variety of ways, select a set of Web addresses that are expected to meet the user's criteria, and present this list, often in rank order, to the user. Or the specialized program may directly connect the user to the address selected as meeting the user's criteria.

Increasingly, sites on the Web are becoming larger, as companies increasingly use the Web to facilitate large scale electronic commerce and for other purposes.

Some sites which make themselves available to users, and to which users are directed by Web browsers or search engines, may be very large, and may have available several types of information. For example, an electronic commerce or shopping site may have material such as consumer guides, electronic yellow pages, and the like. It may be useful, when a user is accessing one portion of such a site, or when the user requests information of one type, also to be able to provide related information of another type.

Some prior methods of identifying and retrieving related information maintained in the Web site have not proven fully satisfactory. For example, it may be possible to manually associate items of data in a Web site with key words, such that when a user accesses or requests information of one type, such as consumer guide material, information of another type with the same key word or words is also returned or otherwise made available to the user. However, methods requiring the manual assignment of key words may be difficult to implement and update, particularly if the underlying information is frequently changing, as may be the case in a dynamic field such as electronic commerce. It therefore may be useful to have available a method of automatically identifying related information of another type when a user accesses one portion of a Web site, or when a user inquiry is received that seeks information of one type.

A limitation in current methodology that may limit the ability so to provide related information is the difficulty in maintaining in a conveniently and quickly usable form information about the content of a site on the Web. An efficient specialized program for generating lists of useful material in response to user inquiries may utilize information about a Web site that is stored in data bases accessible to the specialized program.

Inverted term lists are frequently utilized to store information about Web pages or sites in a database. An inverted term list may be prepared for each term present in the collection of material being analyzed. (Hereinafter, for simplicity, "document" may be used to refer to the items, such as pages or other portions of Web sites, in the Web site being analyzed. A "term" may be any word, number, acronym, abbreviation or other collection of letters, numbers and symbols which may be found in a fixed order in a document.) Alternatively, lists may be prepared for all terms except certain common words, referred to as stop words, such as "the" or "and". Alternatively, lists may be prepared only for a specialized subset of terms of special interest, such as technical terms in a particular field, or names.

An inverted term list for a term may contain information about the overall occurrence of that term in the Web site being analyzed. The information which may be maintained in an inverted term list for a given term may include information such as the total number of documents in the Web site in which that term occurs, the total number of occurrences of that term in the documents, and the maximum number of occurrences of that term in any single document, among other things. (Alternatively, some or all of this information may be stored in a lookup table which also contains the address of the inverted term list for the term in question.)

An inverted term list also will include information about the occurrence of that term in particular documents. For each document in which that term occurs, the inverted term list may include information about the location of the document in the Web site, or a reference to a lookup table where such information is stored. The inverted term list may also include the number of occurrences of that term in that document. In addition, the inverted term list may include other information about the occurrences of that term in that document, such as the locations in that document of its occurrences.

An inverted term list may be stored in the form of a linked list or as an array. In a linked list, there may be a header containing the general information that is not specific to a particular document, such as but not limited to the number of occurrences of the term in the Web site, if that information is not maintained in the lookup table. In the linked list there may also be one link for each document in which the term appears. In this arrangement, each link in an inverted term list will contain the location of a document in which that term appears, together with such information about the occurrence of that term in that document as is being maintained, and the address of the next link in the inverted term list. (To save storage space, rather than containing the URL of a document, the inverted term list may contain the address in a lookup table at which the URL is stored. To further save storage space, the inverted term list may store that lookup table address relative to the lookup table address of the prior document in the inverted term list, rather than as an absolute address.)

Inverted term lists are helpful for many techniques for searching large collections of documents for documents of interest. For example, in retrieving portions of a Web site that may be of interest to a user who has accessed another portion of the site, it may be necessary to locate documents from the Web site which contain a particular word. However, if the Web site is large, it is not desirable to conduct a full new search of the Web site for documents containing the specified word. Inverted term lists resolve that problem. To locate documents containing a particular word of interest, it is simply necessary to consult the inverted term list for that word. It is also possible to list the documents in the inverted term list such that those that use the desired word more often are placed at the top of the list; this may help find the most useful document more quickly.

More complicated requests also may be handled with inverted term lists. For example, if it is required to locate documents in which two particular words occur, it is simply necessary to consult the inverted term lists for both words, and to choose any documents which are found on both lists. Again, documents that may be more useful may be placed higher on the list of useful documents, according to considerations such as but not limited to how many occurrences they have of the desired words.

Current techniques for Web searching and retrieval, including techniques for searching and retrieval of information in a large Web site, that do not maintain information about documents in the collection in an accessible data base, other than by means of inverted term lists, may pose problems. In particular, they do not organize and maintain information by the underlying document, rather than by the terms of interest. This leads to a number of problems in retrieving portions of Web sites that may be of interest to a user who has accessed another portion of the Web site, which will now be discussed.

For example, in the course of choosing documents anticipated to be useful to a user, it may be useful to calculate the score a given document will achieve under a particular search query. Under conventional methods, where no information is stored by document in a data base, it is necessary, in order to calculate a document score, to consult an inverted term list for each term in the search query, and to search within each such inverted term list to determine if that term occurs in the document in question. It could be more efficient if in calculating the document score one could avoid consulting inverted term lists for terms which do not occur in the document.

There is a further problem that occurs as a result of the fact that some conventional methods do not store information in a manner organized by document. It is recognized that searches for useful documents can take a relatively long time to process. This is because as the search criteria become complicated, more and more inverted term lists need to be referenced. Moreover, as the underlying Web site becomes bigger, each inverted term list becomes longer, including as it does all references to the term in question in the Web site. An inverted term list is likely to be particularly long if the term in question is relatively common.

Prior efforts to address this problem include refusing to permit the use of common words as part of a search inquiry. As noted above, words such as "the" or "and" may be omitted. Other common words, however, can be of use in narrowing down the search to more useful documents. For example, it might be of interest to find all documents referring to the occurrence of "osteoporosis" in "women." While searching on "osteoporosis" alone will produce these documents, it may also produce many extraneous documents. It would thus be useful to use the word "women" to refine the search. But this word is very common, and hence is likely to occur in many documents. There is thus a need for a method of making complex searches which include many terms more efficient.

The method that is often referred to as "query by example" is one of a number of prior methods of using the contents of a single document to find similar documents. This may be done, for example, by relevance feedback by having a user begin with a search query, and then by presenting the user with documents selected by means of the query, and allowing the user to identify one (or more) of the resulting documents as relevant. The method then chooses terms from the documents identified as relevant (based upon their statistics) and expands and reruns the query. This method, however, has not been applied to automatically link together portions of a Web site, without the need for explicit hyperlinking or manually indexing the pages.

BRIEF DESCRIPTION OF DRAWINGS

The above-mentioned and other features of the invention will now become apparent by reference to the following description taken in connection with the accompanying drawings in which:

FIG. 1 is a schematic diagram of a computer system that may be operated according to the present invention.

FIG. 2 illustrates a conventional (prior art) relationship between documents and inverted term lists.

FIG. 3 illustrates conventional (prior art) lookup tables which may be used in conjunction with inverted term lists.

FIG. 4 illustrates a relationship between documents and compressed document surrogates according to the present invention.

SUMMARY OF THE INVENTION

Figure 5:
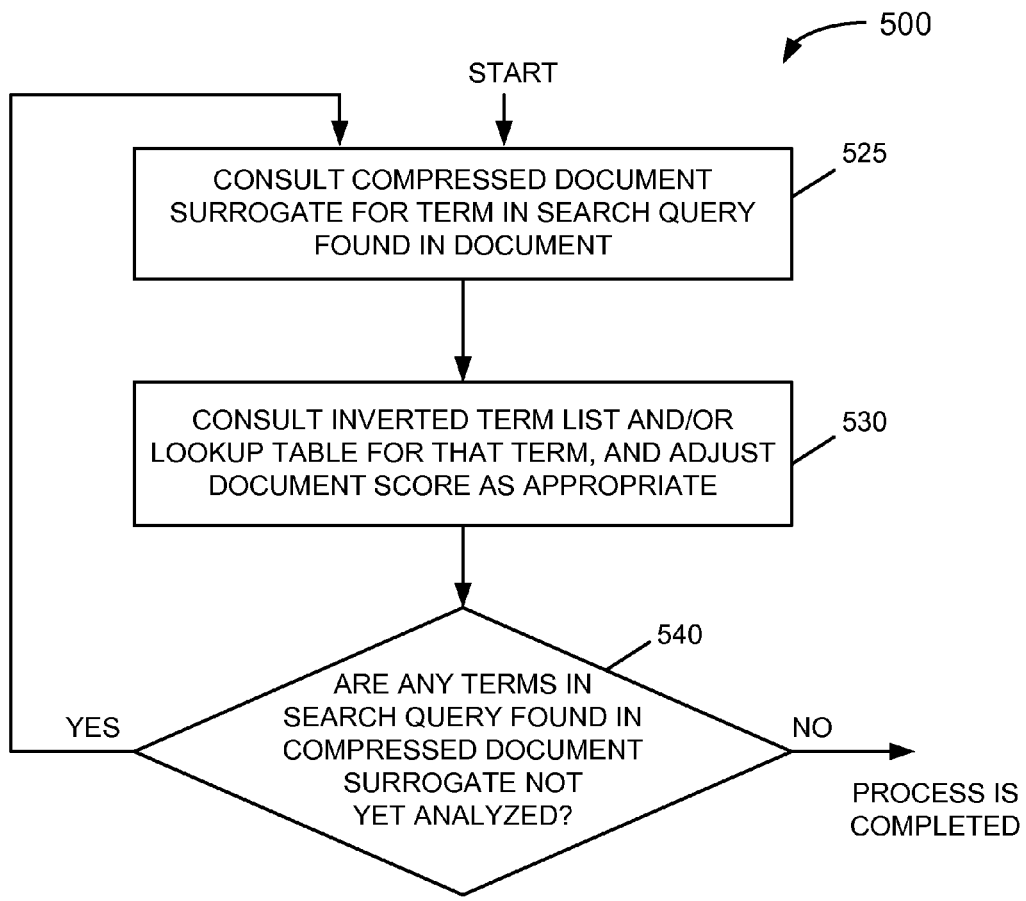
FIG. 5 is a flow chart which illustrates a process by which a document score may be calculated, using compressed document surrogates according to the present invention.

According to the present invention, choosing for presentation to a user who has accessed a document in a Web site, other documents contained in the Web site which may be of interest to the user, includes (a) creating a search query comprising the terms in the document accessed; (b) applying the search query to a collection of documents contained in the Web site, and (c) presenting to the user other documents in the collection which achieve the highest scores on the search query. The search query may be created and applied, and the results presented to the user, automatically when a user accesses the document in the Web site, or in response to a request from the user. The documents may be Web pages. The documents chosen may be selected from the collection of documents according to the scores achieved when evaluating documents in the collection according to a formula giving scores to documents depending upon an occurrence in the documents of terms which occur in the document accessed by the user. A predetermined number of documents may be selected. The predetermined number of documents may be 100. All documents with scores exceeding a predetermined cutoff value may be selected. A score $S_D$ of a document D in the collection may be determined by crediting the document D, for each term T in the document accessed by the user which occurs in the document D, with an amount proportional to Robertson's term frequency $TF_{TD}$ and to $IDF_T$. The determination of the documents in the collection which receive the highest scores may be carried out using compressed document surrogates. The score given to a document, as a result of containing a term which occurs in the document accessed by the user, may depend upon how often the term occurs in the document accessed by the user, compared to how often the term occurs in the documents in the Web site. A score $S_D$ of a document D in the collection may be determined by crediting the document D, for each term T in the document accessed by the user which occurs in the document D, with an amount proportional to $W_T$, to Robertson's term frequency $TF_{TD}$ and to $IDF_T$. The determination of the documents in the collection which receive the highest scores may be carried out using compressed document surrogates. The search query may further comprise index terms manually assigned to the document accessed. The documents chosen may be selected from the collection of documents according to the scores achieved when evaluating documents in the collection according to a formula giving scores to documents depending upon an occurrence in the documents of terms which occur in the document accessed by the user, and of index terms manually assigned to the document. The score given to a document, as a result of containing a term which occurs in the document accessed by the user, or an index term assigned to the document accessed, may depend upon how often the term occurs in the document accessed by the user, compared to how often the term occurs in the documents in the Web site. The score given to a document, as a result of containing a term which occurs in the document accessed by the user, may depend upon how often the term occurs in the document accessed by the user, compared to how often the term occurs in the documents in the Web site, and the score given to a document, as a result of containing an index term assigned to the document accessed, may depend upon a weight assigned to the index term.

DETAILED DESCRIPTION OF THE PREFERRED EMBODIMENT(S)

Referring to FIG. 1, a computer system 1 includes a workstation 2 having local storage 3. The workstation may also be connected to a local area network 4 and may access to the Internet 5. The Internet 5 may include or be coupled to remote storage 6. The workstation 2 may be any one of a variety of commercially available computers capable of providing the functionality described in more detail below. The local storage 3 may include ROM, RAM, a hard disk, a CD, or any other media capable of containing data and/or programs for the workstation 2 or other data. The local area network 4, which is coupled to and exchanges data with the workstation, may also contain data and/or program information for use by the workstation 2. The Internet 5 may be accessed in a conventional manner by the workstation 2. Alternatively, the workstation 2 may access the Internet 5 through the local area network 4, as shown by the dotted line of FIG. 1. The remote storage 6 may also contain data and/or program information for the workstation 2 or may contain other information, as will become apparent from the description below.

In the system described herein, a user may access a Web site on the Internet 5 from the workstation 2, either directly or through the local area network 4. The user may access the Web site by using a Web browser or search engine of a type that will be familiar to one of ordinary skill in the art.

According to the system, when the user accesses the Web site, he may be given a list of other portions of the Web site which may be of interest to him, based upon the portion of the Web site he is accessing.

The portion of the Web site being accessed may be a Web page, or any other subdivision of the site.

According to the system, information retrieval techniques are utilized to locate other portions of the Web site that may be of interest to one interested in the portion of the Web site accessed.

In one embodiment of the system, when a portion of the Web site is accessed, a search query is formed which comprises the terms in the portion of the Web site being accessed. This query is then used to analyze the other portions of the Web site. In this embodiment, the portions of the Web site analyzed may be Web pages or other convenient subdivisions. (The term "document" will be used to refer to the portions, such as pages or other subdivisions, into which the Web site is divided.)

In the system, each document in the Web site is given a score based upon the occurrence in the document of terms from the document being accessed by the user.

In one embodiment of the system, the scores assigned to a document in the Web site are determined by using a formula which utilizes Robertson's term frequency score, where $T_0$ is the number of terms in the document D being accessed by the user:

$$S_D = \sum_{T=1}^{T_0} TF_{TD} * IDF_T,$$

where: $S_D$ is the total score for a document D, $$TF_{TD} = \text{Robertson's term frequency for Term } T \text{ in Document } D$$
$$= N_{TD}/(N_{TD} + K_1 + K_2 * (L_D/L_0)),$$

where:
$N_{TD}$ is the number of times the term T occurs in document D,
$L_D$ is the length of document D,
$L_0$ is the average length of a document in the Web site, and
$K_1$ and $K_2$ are constants. (In one embodiment, $K_1$ may be assigned a value of 0.5, and $K_2$ 1.5, but these values may be varied without departing from the spirit and scope of the invention.)
and $IDF_T = \log((N+K_3)/N_T)/\log(N+K_4)$
where:
N is the number of documents Web site,
$N_T$ is the number of documents containing the term T in the Web site,
$K_3$ and $K_4$ are constants. (In one embodiment, $K_3$ may be assigned a value of 0.5, and $K_4$ 1.0, but these values may be varied without departing from the spirit and scope of the invention.)

Documents are then ranked in order of their scores $S_D$, and those which achieve the highest score are presented, in order of their scores, to the user. In operation, approximately one hundred terms are presented to the user, but the exact number is not critical, and may be varied without departing from the scope or spirit of the invention.

In another embodiment of the system, the analysis is not carried out, and the list is not returned to the user, unless the user requests a list of related portions of the Web site, as by "clicking" with a mouse on a designated portion of the Web site, or utilizing a similar signaling device. Such devices will be familiar to one of ordinary skill in the art.

In one embodiment of the system, the documents are Web pages.

In another embodiment of the system, the terms in the search query are weighted before the set of documents in the Web site are analyzed. In this embodiment, each term in the search query is assigned a score based upon the frequency of its occurrence in the document being accessed by the user, compared to the frequency of its occurrence on average in documents in the Web site as a whole. In the preferred embodiment, the formula used in weighting terms is:

$$W_T = \log(P_T(R)/P_T(R)), \text{ where}$$

$W_T$ = the weight assigned to a term $T$, $P_T(R)$ = the probability the term $T$ occurs in the document being accessed by the user, $$= N_{TR} \Big/ \left(\sum_R N_{tR}\right), \text{ where}$$

$N_{TR}$ = the number of occurrences of the term $T$ in the document being accessed by the user, $\sum_R N_{tR}$ = the total number of occurrences of terms in the document being accessed by the user, $P_T(R)$ = the probability that the term $T$ occurs in the Web site, $$= N_{TR} \Big/ \left(\sum_R N_{tR}\right), \text{ where}$$

$N_{TR}$ = the number of occurrences of the term $T$ in the Web site $\sum_R N_{tR}$ = the total number of occurrences of the terms in the Web site This particular formula is by no means the only formula that may be used; others will be apparent to one of ordinary skill in the art. For example, without departing from the spirit and scope of the invention, other formulas which attempt to weight terms in documents of interest, such as are used in relevance feedback techniques or query by example techniques, may be used.

In the preferred embodiment, the search query consisting of the terms in the document being accessed by the user then is carried out, with the terms in the query weighted according to the following formula, which is Robertson's term frequency score, where $T_0$ is the number of terms in the document being accessed by the user:

$$S_D = \sum_{T=1}^{T_0} W_T * TF_{TD} * IDF_T,$$

where: $S_D$ is the total score for a document D, $W_T$ has the value set forth above, $TF_{TD}$ = Robertson's term frequency for Term $T$ in Document $D$ -continued
$$= N_{TD}/(N_{TD} + K_1 + K_2 * (L_D/L_0)),$$

where: $N_{TD}$ is the number of times the term T occurs in document D, $L_D$ is the length of document D, $L_0$ is the average length of a document in the Web site, and $K_1$ and $K_2$ are constants. (In one embodiment, $K_1$ may be assigned a value of 0.5, and $K_2$ 1.5, but these values may be varied without departing from the spirit and scope of the invention.)

and $IDF_T = \log(N+K_3)/N_T)/\log(N+K_4)$ where:

N is the number of documents in the Web site, $N_T$ is the number of documents containing the term T in the web site, $K_3$ and $K_4$ are constants. (In one embodiment, $K_3$ may be assigned a value of 0.5, and $K_4$ 1.0, but these values may be varied without departing from the spirit and scope of the invention.)

Documents are then ranked in order of their scores $S_D$, and those which achieve the highest score are presented, in order of their scores, to the user. In operation, approximately one hundred terms are presented to the user, but the exact number is not critical, and may be varied without departing from the scope or spirit of the invention.

In another embodiment of the system, index terms may be manually assigned to documents, and those terms may be added to the search query which contains the terms found in the document. In one embodiment, the resulting search query terms would not be weighted, while in a further embodiment, the search query terms found in the document and the manually-assigned index terms could be weighted with weights $W_T$ according to the formula set forth above. In a further embodiment, the search query terms found in the document could be weighted with weights $W_T$ according to the formula set forth above, while the manually-assigned terms could have weights associated with them at the time of their assignment by another means, such as manually.

The remaining aspects of the system all respond to problems which arise out of the fact that many common schema for the maintenance of information about documents in a Web site rely upon the use of inverted term lists to maintain information about the use of various terms in the documents, but do not maintain information about the documents themselves, other than through the inverted term lists.

In order to understand these aspects of the system, it is appropriate first to describe the structure of a conventional inverted term list, and its relationship to the underlying collection of documents about which it contains information. FIG. 2 illustrates one possible conventional relationship between underlying documents in a document collection, such as a set of Web pages in a Web site, and associated inverted term lists which may be used to facilitate the retrieval of desired documents from the collection.

In constructing inverted term lists, it may be necessary to decide what terms should be included. It may be determined to store information with respect to all terms which occur in documents in a collection, or it may be determined to exclude common words such as "the" and "and," or it may be decided to store information only about certain specified terms, such as those which may occur in a particular field such as a scientific or technical discipline. (A term may be a word, a number, an acronym, an abbreviation, a sequential collection of the above, or any other collection of numerals, letters and/or symbols in a fixed order which may be found in the documents in the collection to be searched.) In general, terms that are considered to be useful for purposes of retrieving documents may be selected. (Hereinafter, the terms about which it has been determined to store information are referred to as the "terms of interest.")

An inverted term list may be created for each term of interest that is found to occur in any of the documents in the collection. In the example illustrated in FIG. 2, inverted term lists 835, 840, 845 identify, by means of providing a unique document identifier number, every document from the collection in which corresponding terms 836, 841, 846 occur, and state how many times each of the terms 836, 841, 846 occurs in the document. Thus, in FIG. 2 the inverted term list 835 corresponding to the term 836 states how often the term 836 occurs in each of the documents 805, 815, 825 in the collection. In this example, the inverted term list 835 for the term 836 contains an entry for the unique document identifier number of the first document, "1", and states that the term 836 occurs twice in Document 1 805, then an entry for the unique document identifier number, "2", of the second document, and a statement that the term 836 occurs once in Document 2 815, then an entry for the unique document identifier number, "3", of the third document, and a statement that the term 836 occurs twice in Document 3 825, and so on. It will be appreciated by one of ordinary skill in the art that inverted term lists may also contain other information as well, as will be discussed below.

Inverted term lists may be stored as linked lists, or they may be fixed arrays.

Lookup tables may be created in connection with inverted term lists. One lookup table which may be created may provide the locations in the document collection of the documents whose contents have been indexed in the inverted term lists; if the documents are Web pages, the URLs of the pages may be provided. An example of such a lookup table is shown in the upper portion of FIG. 3. The document URLs may be stored in the lookup table in the order of the unique document identifier numbers of the documents. Then, if the inverted term lists contain the document identifier numbers of the documents which contain the term in question, and the lookup table is maintained as a fixed array, the location in the lookup table array of an actual document URL may be determined directly from the document identifier number.

If such a lookup table is not created, inverted term lists may contain the locations in the document collection, such as the URLs, of the documents which contain the term in question.

Another lookup table which may be created may provide information about the terms for use when searches for relevant documents are done using the inverted term lists. An example of such a lookup table is shown in the lower portion of FIG. 3. For each term, this lookup table may contain the English (or other natural language) term itself, the address of the inverted term list for the term, and other information which may be of use in using the inverted term lists to rank documents for relevance, such as, but not limited to, the number of documents in the Web site in which the term occurs, the number of times the term occurs in documents in the Web site, and the maximum term frequency score for the term in any one document in the Web site.

The term frequency scores for the term may be calculated based on any one of a number of formulae which will be familiar to one of ordinary skill in the art, such as but not limited to Robertson's term frequency formula:

$$TF_{TD}=N_{TD}/(N_{TD}+K_1+K_2*(L_D/L_0)),$$

where: $N_{TD}$ is the number of times the term T occurs in document D, $L_D$ is the length of document D, $L_0$ is the average length of a document in the Web site, and $K_1$ and $K_2$ are constants. (In one embodiment, $K_1$ may be assigned a value of 0.5, and $K_2$ 1.5, but these values may be varied without departing from the spirit and scope of the invention.)

The terms may be stored in this lookup table in any order, such as alphabetical order. For ease of reference they may be stored in the numerical order of unique term identification numbers assigned to each term. If this is done, and the lookup table is maintained as a fixed array, the location of information about a term in the lookup table may be determined directly from the term identification number of the term.

The inverted term lists also may contain the number of documents in the Web site in which the term occurs, the number of times the term occurs in documents in the Web site, and/or the maximum term frequency score for the term in any one document in the Web site, if this information is not maintained in the lookup table which contains the address of the inverted term list for the term. The inverted term list for a term also may contain, not simply the number of times the term occurs in a particular document, but the location in the document at which the term occurs.

A single inverted term list may be maintained for each term of interest. Alternatively, in order to permit more expeditious search query analysis, two inverted term lists may be maintained for each term of interest. The first, or "top" inverted term list, may contain information about an arbitrary number of documents, such as 1000, which have the highest term frequency scores for the term. The second, or "remainder" inverted term list, may contain information about the occurrence of the term in the remaining documents. (If separate top and remainder inverted term lists are maintained, then a lookup table which contains the maximum term frequency scores for terms may contain separate maximum term frequency scores for documents on the term's top inverted term list and for documents on the term's remainder inverted term list.)

In the inverted term lists, information about documents may be stored in order of the term frequency score for the documents, so that the documents with the highest term frequency scores are placed at the top of the inverted term list.

Referring now to FIG. 4, a further aspect of the system comprises a device known as a compressed document surrogate for storing information about a document that is part of the Web site.

It may be determined to store information with respect to all terms which occur in documents in the Web site, or it may be determined to exclude common words such as "the" and "and," or it may be decided to store information only about certain specified terms, such as those which may occur in a particular field such as a scientific or technical discipline. (A term may be a word, a number, an acronym, an abbreviation, a sequential collection of the above, or any other collection of numerals, letters and/or symbols in a fixed order which may be found in the documents in the collection to be searched.)

Insofar as the compressed document surrogates are to be used in conjunction with inverted term lists, the same set of terms which the inverted term lists cover may be used in the compressed document surrogates. (Hereinafter, the set of terms about which it has been determined to store information are referred to as the "terms of interest.")

A compressed document surrogate for a particular document comprises a table of desired information about all of the terms of interest which occur in the document, in a suitable order. This desired information may include the number of times the term occurs in the document, and/or the term frequency score for the occurrence of that term in that document, according to Robertson's term frequency formula or any other formula, and/or the location in the document (in absolute terms or relative to the prior occurrence) of each occurrence. (Other relevant information may be added at the discretion of the user without departing from the spirit or scope of the invention.) Alternatively, a compressed document surrogate may simply indicate that a term occurs in the document, with no further information about specific occurrences or about the number of occurrences. A compressed document surrogate may provide the address of the inverted term list for each term of interest which occurs in the document, and/or the address of the location in the inverted term list of the entry for that document. Alternatively, a compressed document surrogate may provide the address of a location in a lookup table of a term of interest which occurs in the document, or information, such as a term identification number, from which the address of a location in a lookup table of the term may be determined.

In the preferred embodiment of a compressed document surrogate illustrated in FIG. 4, it is determined to store information about all terms which occur in documents, other than specified common words. In this embodiment, it is further decided that a compressed document surrogate for a document shall identify each term of interest found in the document, and specify how many times the term occurs in the document, but shall provide no further information about the occurrence of terms in the document.

In this embodiment, the term information in the document surrogates is stored in order of term identification number. Each term is assigned a unique integer identification number. (Term identification numbers are assigned to terms in the order in which the terms are first encountered in the course of constructing the table and associated inverted term lists, so that the first term found in the first document indexed is assigned the term identification number "1", and so on. Since terms are assigned unique term identification numbers, when a term already assigned a term identification number is encountered again, either in the same or in a subsequent document, no new term identification number is assigned to it.) Rather than storing the term identification numbers themselves, the differences from the previous term identification numbers are stored. For example, the following indicates that Term 1 appears 5 times, Term 10 appears 1 time, and so forth:

(1,5)(10,1)(30,2)(50,3)(100,4).

In the preferred embodiment, where the differences or offsets from the previous term identification numbers are stored, what is actually stored is:

(1,5)(9,1)(20,2)(20,3)(50,4).

By storing the differences instead of the term identification numbers, the numbers to be stored will be considerably smaller. This allows the surrogate to be compressed by using a variable length encoding of the integer values. The differences are encoded using Golomb coding. (Golomb, S. W. 1966. Run-length encodings. IEEE Transactions on Information Theory, vol. 12 no. 3 pp 339-401)

The term counts are encoded in unary, i.e. the number 1 is encoded as 0, 2 is encoded as 10, 3 as 110 etc. Someone of ordinary skill in the art will recognize that other variable length encodings may also be used to encode these values.

By compressing the differences and counts, the document surrogates can be stored in only 10% of the space required by the original text. Similarly, if one were to store the within document position in the surrogate, the difference from the previous position would be stored rather than the absolute position. (Thus, a term occurring in positions 1, 3, 5, and 10 in a document will have this information stored as 1, 2, 2, 5.) As before, the smaller average sizes allow the information to be encoded in fewer bits, thereby saving space.

Thus, in FIG. 4, a surrogate 810 lists a term identification number, "1", of a first term, Term 1, used in a document 805, and the number of occurrences (two) of Term 1 in the document 805. The surrogate 810 then lists the difference between the term identification number, "1" of the first term, and the term identification number "2" of a second term, Term 2, which occurs in the document 805, namely "1", and the number of occurrences (two) for Term 2 in the document 805, reflecting that that term is present in the document 805. The surrogate 810 then lists the difference between the term identification number, "2" of the second term, and the term identification number "3" of a third term, Term 3, which occurs in the document 805, namely "1", and the number of occurrences (one) for Term 3 in the document 805, reflecting that that term is present in the document 805. Note that the surrogate 810 only contains a single entry for Terms 1 and 2, even though the terms occur more than once in the underlying document 805. Similarly, a surrogate 820 for a second document 815 lists the term identification number, "1", of Term 1, and the number of occurrences (one) of Term 1 in the document 815, because Term 1 is present in the Document 815, but the surrogate 820 does not list Term 2, because Term 2 is not present. The surrogate 820 then lists the difference between the term identification number, "3", of Term 3, and the term identification number of Term 1, "1", namely "2", and the number of occurrences of Term 3, because Term 3 is present, and so on.

Terms may be stored in a surrogate in any suitable order, such as but not limited to alphabetical order. In the preferred embodiment described here, the terms are stored in order of term identification number. In the preferred embodiment, in order to conserve space, further information about terms is stored in a lookup table of the type illustrated in the lower portion of FIG. 3. The location in the lookup table of information concerning the term of interest may be determined from the term identification number, in that the term lookup table is a fixed array and terms are stored in the table in order of the term identification number. For each term, the term lookup table identifies the actual term and contains further information about the term, such as the location of an inverted term list for the term, the number of documents in the collection in which the term occurs, and the maximum term frequency scores for the term in any one document in the term's "top" inverted term list, and in any one document in the term's "remainder" inverted term list.

A further aspect of the system which takes advantage of compressed document surrogates to facilitate carrying out search queries to locate documents in the Web site which may be of interest to a user accessing one document in the Web site may now be illustrated.

It may be necessary, in ranking the documents in the Web site to locate other documents that may be of interest to a user accessing one document in the Web site, to do so by assigning each document in the Web site a score according to whether or not terms in the document accessed by the user occur in the document. The score for a document is determined by searching the inverted term lists for all of the terms which occur in the document being accessed by the user. Because it is not known prior to beginning such a search which of these terms is in the document, it is necessary to search the inverted term lists for all of the terms in the document being accessed by the user to determine the score for a document. Finding whether a given document occurs in an inverted term list may be a relatively time-consuming process, if there are many terms in the document being accessed.

One aspect of the present system, however, may permit a document score to be determined more quickly by the use of the document's compressed document surrogate. Referring to FIG. 5, a process 500 begins at a step 525 by examining a compressed document surrogate for a document to be scored. A term in the document accessed by the user which occurs in the document being scored is identified by using the compressed document surrogate. Then, a step 530 calculates the score resulting from the occurrence of the term in the document being scored by consulting, if necessary, a lookup table and/or inverted term list for the term. Then, a step 540 determines whether any other terms in the document accessed by the user, which are found in the compressed document surrogate, have not yet been analyzed. If all terms in the document accessed by the user that are found in the compressed document surrogate have been analyzed, the process 500 is completed. Otherwise, the process 500 continues by returning to the step 525 to choose the next term in the document accessed by the user which occurs in the document and has not yet been analyzed, and then doing the appropriate calculation and adjustment of score.

In the preferred embodiment, at the step 530 it is not necessary to consult the inverted term list for the term, since the number of occurrences of the term in the document being scored is known from the compressed document surrogate, and the remaining information necessary to calculate the document's score may be determined from the term lookup table by use of the term identification number in the compressed document surrogate, without the need to refer to the inverted term list itself.

A further aspect of the system which takes advantage of compressed document surrogates may now be described.

One formula that may be used to locate other documents in a Web site which may be of interest to a user accessing one document in the Web site is:

$$S_D = \sum_{T=1}^{T_0} W_T * TF_{TD} * IDF_T,$$

where: $S_D$ is the total score for a document D, $W_T$ has the value set forth above, $TF_{TD}$=Robertson's term frequency for Term $T=N_{TD}/(N_{TD}+K_1+K_2*(L_D/L_0))$, where: $N_{TD}$ is the number of times the term T occurs in document D, $L_D$ is the length of document D, $L_0$ is the average length of a document in the Web site, and $K_1$ and $K_2$ are constants. (In one embodiment, $K_1$ may be assigned a value of 0.5, and $K_2$ 1.5, but these values may be varied without departing from the spirit and scope of the invention.)

and $IDF_T=\log((N+K_3)/N_T)/\log(N+K_4)$ where: N is the number of documents in the Web site, $N_T$ is the number of documents containing the term T in the Web site, $K_3$ and $K_4$ are constants. (In one embodiment, $K_3$ may be assigned a value of 0.5, and $K_4$ 1.0, but these values may be varied without departing from the spirit and scope of the invention.)

The formula set forth above is by no means the only formula that may be used; others will be apparent to one of ordinary skill in the art. The formula among others takes advantage of the fact that a "rare" term is a more powerful predictor of document utility than a common term, by giving greater weight in ranking documents to those that occur relatively less often in the Web site. For example, if it is desired to find documents referring to osteoporosis in women, the term "osteoporosis" alone, if it occurs in the Web site in fewer documents than the term "women," may be of more utility as a filter than the term "women." However, it may also be true that, among documents which refer to osteoporosis, those that also mention women are more likely to be useful than those that do not. Hence, the formula does not exclude the common term from the search process entirely.

According to the system described herein, it is possible to reduce the time taken to analyze a search query consisting of the set of terms in the document being accessed by the user, and return a ranked list of N documents which may be of interest to the user, by using compressed document surrogates.

Figure 6:
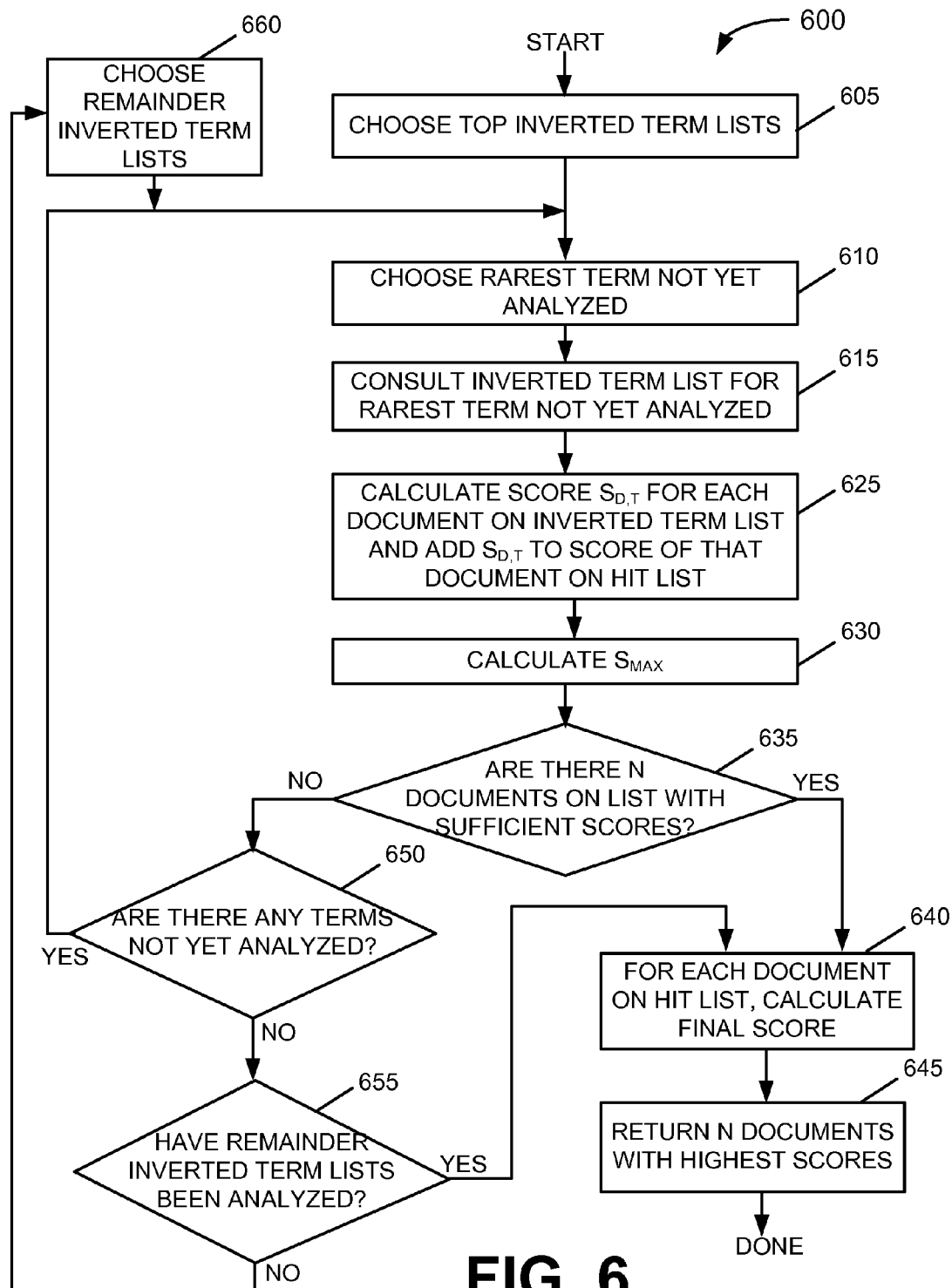
FIG. 6 is a flow chart which illustrates a process by which a search query may be carried out, using compressed document surrogates according to the present invention.

Referring to FIG. 6, a preferred embodiment for doing so is illustrated. A process 600 begins with a step 605 wherein it is determined to begin using top inverted term lists for the terms in the query. (The query consists of the terms in the document being accessed.)

According to FIG. 6, the process 600 then iterates until a sufficient number of candidate documents for inclusion in the final ranking of N documents is generated.

The iterative portion of the process 600 begins at a step 610 by choosing, from among those terms which are specified as being desired in the query, the most significant term whose top inverted term list has not yet been analyzed. Documents may be ranked in order of significance using any one of a number of measures which will be known to those of ordinary skill in the art. In the preferred embodiment discussed here, the ranking is done by using $W_T*IDF_T$, where $W_T$ and $IDF_T$ have the values set forth above.

At a step 615, a top inverted term list for that most significant not-yet-analyzed desired term is examined. In the embodiment illustrated herein, the top list contains one thousand documents, but the number of documents may vary according to a variety of functional factors familiar to one of ordinary skill in the art, such as the total number of documents of potential interest.

The process 600 then continues at a step 625 by calculating, for each document D on the top inverted term list for the term T, the score $S_{TD}$ resulting from its containing the term, where:

$$S_{TD}=W_T*TF_{TD}*IDF_T$$

where:

$W_T$ has the value set forth above, $TF_{TD}$=Robertson's term frequency for Term $T=N_{TD}/(N_{TD}+K_1+K_2*(L_D/L_0))$, where: $N_{TD}$ is the number of times the term T occurs in document D, $L_D$ is the length of document D, $L_0$ is the average length of a document in the Web site, and $K_1$ and $K_2$ are constants. (In one embodiment, $K_1$ may be assigned a value of 0.5, and $K_2$ 1.5, but these values may be varied without departing from the spirit and scope of the invention.)

and $IDF_T=\log((N+K_3)/N_T)/\log(N+K_4)$ where:

N is the number of documents in the Web site, $N_T$ is the number of documents containing the term T in the Web site, $K_3$ and $K_4$ are constants. (In one embodiment, $K_3$ may be assigned a value of 0.5, and $K_4$ 1.0, but these values may be varied without departing from the spirit and scope of the invention.)

If a document D for which a score $S_{TD}$ has been calculated has not previously been found on an inverted term list in the process 600, the document is added to a list L of candidate documents. If the document has been found on an inverted term list previously in the process 600, the document's prior score is adjusted by adding $S_{TD}$ to the prior score.

After this is done, the process 600 continues at a step 630 by calculating the maximum number of points that could be scored by a document not yet found to contain any analyzed term. (That is, a document that contains all of the desired terms not yet analyzed.) That maximum potential score $S_{Max}$ is the sum, over all the desired terms whose hit lists have not yet been analyzed:

$$S_{Max} = \sum_{T=1}^{T_0} W_T * TF_{Max} * IDF_T,$$

where:

$TF_{Max}$ = Robertson's maximum term frequency for Term T
= MAX($N_{TD} / (N_{TD} + K_1 + K_2 * (L_D / L_0))$), where: $N_{TD}$ is the number of times the term T occurs in document D, $L_D$ is the length of document D, $L_0$ is the average length of a document in the Web site, and $K_1$ and $K_2$ are constants. (In one embodiment, $K_1$ may be assigned a value of 0.5, and $K_2$ 1.5, but these values may be varied without departing from the spirit and scope of the invention.)

and $IDF_T = \log((N+K_3)/N_T)/\log(N+K_4)$ where:

N is the number of documents in the Web site, $N_T$ is the number of documents containing the term T in the Web site, $K_3$ and $K_4$ are constants. (In one embodiment, $K_3$ may be assigned a value of 0.5, and $K_4$ 1.0, but these values may be varied without departing from the spirit and scope of the invention.)

At a next step 635, it is determined whether there are already N documents on the list L whose scores exceed $S_{Max}$, the maximum number of points that could be accrued by a document not found on any of the top inverted term lists yet analyzed. If there are N or more such documents, it is unnecessary to look for any further documents by searching the top inverted term lists of the (relatively more common) terms not yet analyzed, and a next step 640 in the process 600 calculates a final score for all of the already-located documents on the list L, so that their rankings may be adjusted to account for the documents containing the more common terms, and a final list of the top N documents may be prepared.

At the step 640, in calculating the final scores for the candidate documents on the list L the process 600 may take advantage of that aspect of the system previously discussed which permits the score of a document to be determined by use of its compressed document surrogate. The process then concludes at a step 645 by ranking the documents on the list L according to the scores of the documents, and returning as its result the N documents which have the highest scores, ranked in order of the scores.

If it is determined at the step 635 that there are not N documents already found whose scores exceed the scores that could be achieved by not-yet-located documents, then the process continues at a step 650 to determine if there are any terms in the document being accessed by the user whose top inverted term lists have not yet been analyzed.

If the process 600 determines at the step 650 that not all terms have had their top inverted term lists analyzed, then the process 600 continues by returning to the step 611 to begin analyzing the most significant desirable term not yet analyzed.

If all terms in the document being accessed by the user have had their top inverted term lists analyzed, then the process 600 proceeds to a step 655. When the process 600 reaches the step 655 after processing top inverted term lists, it is concluded that remainder inverted term lists have not yet been analyzed, and the process 600 proceeds to a step 660. (The path the process 600 will follow when the step 655 is reached after the remainder inverted term lists have been analyzed will be discussed below.)

In the process 600 at the step 660 it is concluded that remainder inverted term lists will now be processed, and control passes to the step 610.

At the step 610, the iterative process of considering the most significant term whose inverted term list has not yet been analyzed begins again, this time considering the remainder inverted term lists. The process 600 cycles through the remainder inverted term lists at steps 615, 625 adding documents to the list L, and increasing the scores of the documents already on the list L, as documents are found on the remainder inverted term lists. As before, after each inverted term list is processed at the step 630 a new $S_{Max}$ is determined. In doing this for the remainder term lists, the maximum term frequency scores again may be determined in the preferred embodiment from the lookup table, but they are not the same maximum term frequency scores as were used for the top inverted term lists. Instead, the lookup table maintains a list of maximum term frequency scores for terms, for documents found in the remainder lists for the terms.

At the step 635 it is determined whether further inverted term lists need to be processed, or whether a sufficient number of documents have been found with sufficiently high scores that no further lists need be searched.

Ultimately, if it is concluded that a sufficient number of documents with sufficiently high scores as described above have been located, then from the step 635 control passes to the step 640, and as described above final scores are calculated, and a final list of N documents with the highest scores is returned, ranked in order of score.

However, if the process 600 proceeds to complete the iterations through all of the remainder inverted term lists without generating a sufficient number of documents with sufficiently high scores, then after the step 635 control passes through the step 650, where it is determined that there are no terms left whose remainder inverted term lists have not yet been processed, to the step 655, where it is determined that because the remainder term lists have been processed, control is to pass to the step 640 to begin the final processing. If the step 640 is reached after the remainder inverted term lists have all been processed, the final scores of the documents on the list L are calculated, and control passes to the step 645 to rank the documents that have been located in order, except that the process returns fewer than N documents.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method, comprising:
 providing, by operation of a computer system, a first document from a web site to a user, wherein the first document includes a plurality of terms;
 automatically, by operation of the computer system, generating a search query from terms included in the first document, wherein the search query includes multiple terms from the first document, and wherein generating the search query comprises:
  determining a respective first ratio for each of the multiple terms in the search query from a number of occurrences of the term in the first document and a total number of term occurrences in the first document,
  determining a respective second ratio for each of the multiple terms in the search query from a number of occurrences of the term in the web site and a total number of term occurrences in the web site,
  computing a respective weight for each of the multiple terms from the first ratio for the term and the second ratio for the term, and
  assigning the respective weight for each of the multiple terms in the search query to the term;
 using the search query to determine a respective score for each of a plurality of documents in the web site, wherein the respective score for each document is based upon occurrences in the document of terms in the search query and on the respective weights assigned to the terms in the search query; and
 identifying a set of documents from the plurality of documents in the web site based on the respective scores.

2. The method of claim 1, wherein generating the search query, using the search query, and identifying the set of documents are performed automatically in response to a user accessing the first document.

3. The method of claim 1, wherein generating the search query and using the search query are performed in response to a request from a user.

4. The method of claim 1, wherein the first document is a web page in the web site and the plurality of documents are web pages in the web site.

5. The method of claim 1, further comprising:
 outputting results associated with the identified set of documents.

6. The method of claim 1, wherein determining respective scores for each of the plurality of documents comprises assigning scores using compressed document surrogates associated with the plurality of documents, wherein a particular compressed document surrogate is associated with a particular document among the plurality of documents, and wherein the particular compressed document surrogate comprises data representing counts of the occurrences of at least a subset of terms in the particular document.

7. The method of claim 6, wherein determining respective scores comprises:
 determining a score for a first one of a plurality of compressed document surrogates based on how often at least one term occurs in the first document compared to how often the at least one term occurs in the first compressed document surrogate.

8. The method of claim 6 wherein identifying a set of documents from the plurality of documents in the web site based on the respective scores comprises identifying a set of documents from the plurality of documents in the web site associated with scores greater than a predetermined threshold.

9. The method of claim 1 wherein generating the search query includes generating the search query while presenting the first document to the user.

10. The method of claim 1, wherein computing the respective weight for each of the multiple terms from the first ratio for the term and the second ratio for the term comprises:
 computing the weight for the term by computing a logarithm of a ratio between the first ratio for the term and the second ratio for the term.

11. A system, comprising:
 a computer system and non-transitory media containing a computer program, the computer program programming the computer system to perform operations comprising:
  providing, by operation of a computer system, a first document from a web site to a user, wherein the first document includes a plurality of terms;
  automatically, by operation of the computer system, generating a search query from terms included in the first document, wherein the search query includes multiple terms from the first document, and wherein generating the search query comprises:
   determining a respective first ratio for each of the multiple terms in the search query from a number of occurrences of the term in the first document and a total number of term occurrences in the first document,
   determining a respective second ratio for each of the multiple terms in the search query from a number of occurrences of the term in the web site and a total number of term occurrences in the web site,
   computing a respective weight for each of the multiple terms from the first ratio for the term and the second ratio for the term, and
   assigning the respective weight for each of the multiple terms in the search query to the term;
  using the search query to determine a respective score for each of a plurality of documents in the web site, wherein the respective score for each document is based upon occurrences in the document of terms in the search query and on the respective weights assigned to the terms in the search query; and
  identifying a set of documents from the plurality of documents in the web site based on the respective scores.

12. The system of claim 11, wherein the first document comprises a web page in the web site and the plurality of documents comprises other web pages in the web site.

13. The system of claim 11, wherein determining respective scores comprises determining a score for a first one of a plurality of compressed document surrogates based on how often at least one term occurs in the first document compared to how often the at least one term occurs in the first compressed document surrogate.

14. The system of claim 11, wherein generating the search query, using the search query, and identifying the set of documents are performed automatically in response to the user accessing the first document.

15. The system of claim 11, wherein generating the search query and using the search query are performed in response to a request from a user.

16. The system of claim 11 wherein the operations further comprise:
 outputting results associated with the identified set of documents.

17. The system of claim 11 wherein determining respective scores for each of the plurality of documents comprises assigning scores using compressed document surrogates associated with the plurality of documents, wherein a particular compressed document surrogate is associated with a particular document among the plurality of documents, and wherein the particular compressed document surrogate comprises data representing counts of the occurrences of at least a subset of terms in the particular document.

18. The system of claim 11 wherein generating the search query includes generating the search query while presenting the first document to the user.

19. The system of claim 11, wherein computing the respective weight for each of the multiple terms from the first ratio for the term and the second ratio for the term comprises:
   computing the weight for the term by computing a logarithm of a ratio between the first ratio for the term and the second ratio for the term.

* * * * *